United States Patent
Withofs et al.

(10) Patent No.: US 10,397,018 B2
(45) Date of Patent: Aug. 27, 2019

(54) METHOD FOR OPERATING A DISTRIBUTION POINT UNIT, RESPECTIVE DISTRIBUTION POINT UNIT AND CPE DEVICE

(71) Applicant: THOMSON Licensing, Issy-les-Moulineaux (FR)

(72) Inventors: Tim Withofs, Brasschaat (BE); Geert Van Den Bossche, Lokeren (BE); Wim Van De Sype, Haaltert (BE)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/568,591

(22) PCT Filed: Mar. 18, 2016

(86) PCT No.: PCT/EP2016/055973
§ 371 (c)(1),
(2) Date: Oct. 23, 2017

(87) PCT Pub. No.: WO2016/169707
PCT Pub. Date: Oct. 27, 2016

(65) Prior Publication Data
US 2018/0115436 A1 Apr. 26, 2018

(30) Foreign Application Priority Data
Apr. 24, 2015 (EP) .................... 15305629

(51) Int. Cl.
*H04L 12/10* (2006.01)
*H04L 12/28* (2006.01)
(Continued)

(52) U.S. Cl.
CPC .......... *H04L 12/2869* (2013.01); *H04L 12/10* (2013.01); *H04L 12/40045* (2013.01);
(Continued)

(58) Field of Classification Search
CPC ..... H04L 12/10; H04L 12/40; H04L 12/4045; H04L 19/08; H04M 19/08
(Continued)

(56) References Cited

U.S. PATENT DOCUMENTS 7,652,504 B2   1/2010   Campbell et al.
8,601,289 B1   3/2013   Smith et al.
(Continued)

FOREIGN PATENT DOCUMENTS

EP   2816758        12/2014
EP   2830302         1/2015
EP   2830302 A1 *   1/2015   ............ H04M 19/08

OTHER PUBLICATIONS

Anonymous, "Fast access to subscriber terminals (G.fast) —Power spectral density specification", International Telecommunication Union, ITU-T Telecommunication Standardization Sector of ITU, G.9700—Series G: Transmission Systems and Media, Digital Systems and Networks—Access networks—Metallic access networks, Apr. 2014, pp. 1-22.

(Continued)

*Primary Examiner* — Melur Ramakrishnaiah
(74) *Attorney, Agent, or Firm* — Brian J. Dorini; Patricia A. Verlangieri

(57) ABSTRACT

The method for operating a distribution point unit comprising a selection switch (17) and a monitor and control logic (15) for providing a first and a second service, comprises the steps of: receiving a switching signal powering the monitor and control logic (68), and switching the selection switch from the first service to the second service by the monitor and control logic (70), after receiving the switching signal. The selection switch has a default state, in which the first (Continued)

service is provided. The first service is in particular an xDSL and/or a PSTN service, and the second service is a G.fast service.

13 Claims, 5 Drawing Sheets

(51) Int. Cl.
  *H04L 12/40* (2006.01)
  *H04M 19/08* (2006.01)
  *H04M 11/06* (2006.01)
(52) U.S. Cl.
  CPC ......... *H04M 11/062* (2013.01); *H04M 19/08* (2013.01); *H04L 12/2898* (2013.01)
(58) Field of Classification Search
  USPC .......... 379/93.01, 93.05, 93.07, 93.09, 32.01
  See application file for complete search history.

(56) References Cited

U.S. PATENT DOCUMENTS

| 2010/0150556 | A1 | 6/2010 | Soto et al. | |
|---|---|---|---|---|
| 2010/0150564 | A1 | 6/2010 | Faulkner | |
| 2014/0233951 | A1 | 8/2014 | Cook | |
| 2016/0100048 | A1* | 4/2016 | Hillaert | H04B 3/44 379/32.01 |
| 2016/0248478 | A1* | 8/2016 | Troch | G06F 13/4086 |

OTHER PUBLICATIONS

Anonymous, "Fast access to subscriber terminals (G.fast)—Physical layer specification", International Telecommunication Union, ITU-T Telecommunication Standardization Sector of ITU, G.9701—Series G: Transmission Systems and Media, Digital Systems and Networks—Access networks—Metallic access networks, Dec. 2014, pp. 1-324.

Lange et al., "Analysis of Energy Consumption in Carrier Networks", 2014 International Conference on Optical Network Design and Modeling (ONDM 2014), Stockholm, Sweden, May 19, 2014, pp. 96-101.

Anonymous, Access, Terminals, Transmission and Multiplexing (ATTM); European Requirements for Reverse Powering of Remote Access Equipment; European Telecommunications Standards Institute, Technical Specification 101 548 V1.2.1, Apr. 2015, pp. 1-35.

Anonymous, "Access, Terminals, Transmission and Multiplexing (ATTM); Reverse Power Feed for Remote Nodes", European Telecommunications Standards Institute, Technical Report 102 629 V2.1.2, Mar. 2011, pp. 1-24.

* cited by examiner

METHOD FOR OPERATING A DISTRIBUTION POINT UNIT, RESPECTIVE DISTRIBUTION POINT UNIT AND CPE DEVICE

This application claims the benefit, under 35 U.S.C. § 365 of International Application PCT/EP2016/055973, filed Mar. 18, 2016, which was published in accordance with PCT Article 21(2) on Oct. 27, 2016, in English, and which claims the benefit of European patent application 15305629.6, filed Apr. 24, 2015.

TECHNICAL FIELD

The present disclosure relates to the field of customer premises equipment devices being coupled via a digital subscriber line to a service provider delivering broadband services to a customer.

BACKGROUND OF THE INVENTION

Access gateways are widely used to connect devices in a home of a customer to the Internet or any other wide area network (WAN). Access gateways use for example digital subscriber line (DSL) technology that enables a high data rate transmission over copper lines. During the years, several DSL standards have been established differing in data rates and in range, for example ADSL (Asymmetric digital subscriber line), ADSL2, VDSL (Very High Speed Digital Subscriber Line) and VDSL2, which are referred to in this context as xDSL. Network operators, e.g. Internet service providers, are managing a large amount, up to millions, of residential gateways, also other devices such as routers, switches, telephones and set-top boxes, which are understood in this context as customer premises equipment (CPE) devices.

Fiber to the distribution point (FTTdp) is bringing the fiber optic connection of the service providers closer to the home of the customer. However, the last few 100 meters of the broadband connection are still handled by the existing copper wire to the home: currently being used for legacy technologies such as Public Switched Telephone Network (PSTN) and xDSL.

In order to match the increased speed capabilities that come with bringing the fiber nodes closer to the home, the technology on the copper wire is also evolving to higher speeds. This is the base for the introduction of G.fast as an improved access technology on the copper wire. Formal specifications for G.fast have been drafted as ITU-T G.9700 and G.9701.

FIG. 1 shows the migration from copper links to fiber links closer to the home. For G.fast, a Distribution Point Unit (DPU) provides the link between the optical fiber of the Central Office (CO) with the CPE of the customer. In order to enable a flexible deployment of the DPU close to the home of the customer, the G.fast standardization foresees reverse power feeding for the DPU. In this scenario, the DPU is powered by the CPE, or a separate power injector located at the customer's premises. This enables a flexible placement of the DPU and allows for multiple subscribers to provide power for a DPU.

The benefits of using reverse power feeding lie mainly in flexibility and cost advantages, but several challenges arise. There are safety requirements that need to be met, for example since power is running on the telephone wires, a user might be exposed, or old legacy equipment that might still be connected to the telephone wire might be damaged by this power. Other important aspects to be considered are that the CPE devices can be located at different ranges from the DPU and each cable might have different physical characteristics: diameter, impedance, power loss.

There exists also a conflict between the current telephone system PSTN and the reverse power feeding of the DPU, as illustrated in FIG. 2. An access gateway 2 operates with a digital subscriber line access multiplexer (DSLAM) providing a PSTN service and a VDSL service via a copper line to the access gateway 2, or operates alternatively with a DPU 1 providing a G.fast service. Because the PSTN service includes a 48 V DC-voltage, the PSTN service cannot operate in parallel with the G.fast service provided by the DPU 1 because of the reverse power feeding of the access gateway 2. Service providers and customers need to be aware of this deployment scenario and have to adapt accordingly.

U.S. Pat. No. 8,601,289 discloses an optical network comprising a DPU and a plurality of CPE devices, each CPE device having a reverse power supply and each being connected to a copper wire pair and configured to transmit and receive data and provide reverse power over the wire pair. A power management circuit of the DPU is provided being configured to receive power and to provide power sharing and manage power consumption and power supply redundancy from the plurality of CPE devices.

SUMMARY OF THE INVENTION

The method for operating a distribution point unit, which comprises a selection switch and a monitor and control logic for providing a first and a second service, comprises the steps of: receiving a switching signal, which powers the monitor and control logic, and switching the selection switch from the first service to the second service by the monitor and control logic, when receiving the switching signal. The selection switch has a default state, in which the first service is provided, which is in particular a powerless state.

In a further aspect of the disclosure, a reverse supply power is received in a DPU power supply unit after the second service is selected by the selection switch, and the DPU power supply unit is driving the selection switch via a switch drive logic to keep the second service.

The supply power powers the DPU after the switching signal is switched off, to enable the DPU to provide the second service to a CPE. The first service is for example an xDSL and/or a PSTN service, and the second service is a G.fast service.

The switching signal is in particular a DC-free switching signal, e.g. a pulse signal or an alternating current, and applied only for a limited time interval to power the monitor and control logic temporarily.

The DPU comprises a selection switch and a monitor and control logic for providing the first and the second service, wherein the selection switch is adapted to provide the first service in a default mode, and the monitor and control logic is adapted to receive the switching signal for powering the monitor and control logic, the switching signal triggers also the monitor and control logic to switch to the second service. The DPU comprises in particular a DPU power supply unit coupled with the selection switch to receive a reverse supply power from a CPE providing the switching pulses after the second service is selected, after the switching signal is switched off, to power the DPU for providing the second service to the CPE.

The DPU comprises advantageously a switch drive logic coupled with the selection switch to cause the selection switch to keep the second service after the reverse supply power is received by the DPU power supply. The DPU is designed in particular for an operation with the CPE device in accordance with a G.fast recommendation.

The CPE device comprises a reverse power supply and an AGW drive logic for powering the DPU, wherein the AGW drive logic is adapted to provide a switching signal for powering the monitor and control logic of the DPU and to trigger the monitor and control logic to switch from a first service to a second service, and the reverse power supply is adapted to provide a reverse supply power for the DPU, after the switching signal is switched off.

In another aspect of the disclosure, the first service includes an xDSL and a PSTN service and the CPE device comprises a service switch and a service switch drive logic for enabling the PSTN service, and a broadband analog front end for providing the xDSL service and the second service, wherein the PSTN and the xDSL services are disabled when the AGW drive logic provides the switching signal. The CPE device is further adapted to detect whether a DPU is connected or not, and in case no DPU is detected after a DPU activation phase, the first service is enabled.

BRIEF DESCRIPTION OF THE DRAWINGS

Preferred embodiments of the invention are explained in more detail below by way of example with reference to schematic drawings, which show.

DETAILED DESCRIPTION OF PREFERRED EMBODIMENTS

In the following description, example methods for powering a DPU by at least one CPE device are described. The DPU is designed for providing a first and a second service, the first service being for example an xDSL and/or a PSTN service, and the second service being a G.fast service. For purposes of explanation, various specific details are set forth in order to provide a thorough understanding of preferred embodiments. It will be evident, however, to one skilled in the art that the present invention may be practiced without these specific details.

The DPU includes in a preferred embodiment a controller, e.g. a microprocessor, a memory for the operation of the DPU and in which an operating system is stored, a power supply for receiving supply power from a CPE device and for powering the DPU, a port for an optical fiber connection, e.g. with a central office, and two ports for copper lines, in particular for copper wire pairs. The DPU may include in particular a multitude of G.fast channels for providing the G.fast service to a multitude of CPE devices located in a the homes of customers.

The CPE device includes in a preferred embodiment a controller, e.g. a microprocessor, a memory for the operation of the CPE device and in which an operating system is stored, a power supply for powering the DPU and a port for a copper line, in particular a port for a copper wire pair for an xDSL connection and a G.fast connection. A CPE device of this kind is for example an access gateway, a residential gateway, a business gateway, a router or an Internet switch.

Figure 1:
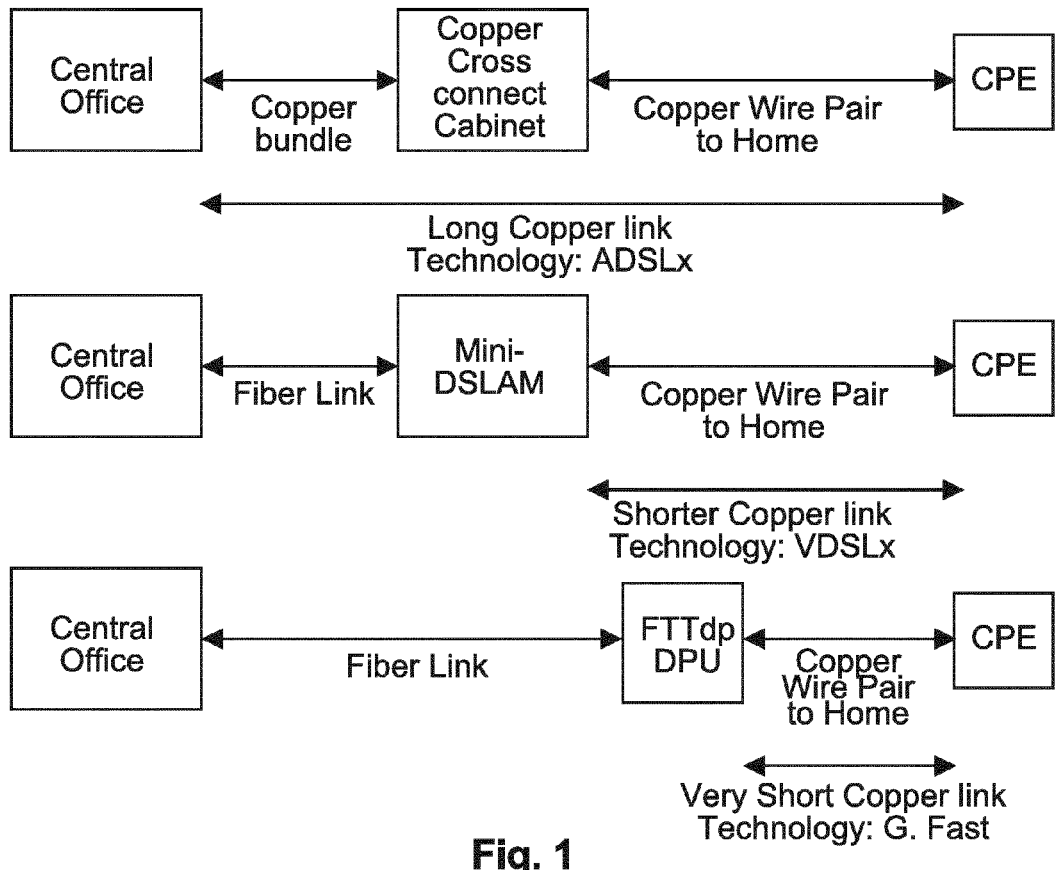
FIG. 1 a migration of broadband services from copper links to fiber links closer to the home, FIG. 2 an access gateway being adapted to operate with a DSLAM providing a PSTN service and a VDSL service and with a DPU providing a G.fast service, FIG. 3 a system according to the invention comprising a DPU and an access gateway being adapted to provide a PSTN service and a VDSL service, or alternatively, a G.fast service with reverse power feeding, FIG. 4 the DPU of the system of FIG. 3, FIG. 5 the CPE device of the system of FIG. 3, and FIG. 6 a method for operating a system in accordance with FIG. 3.
Figure 2:
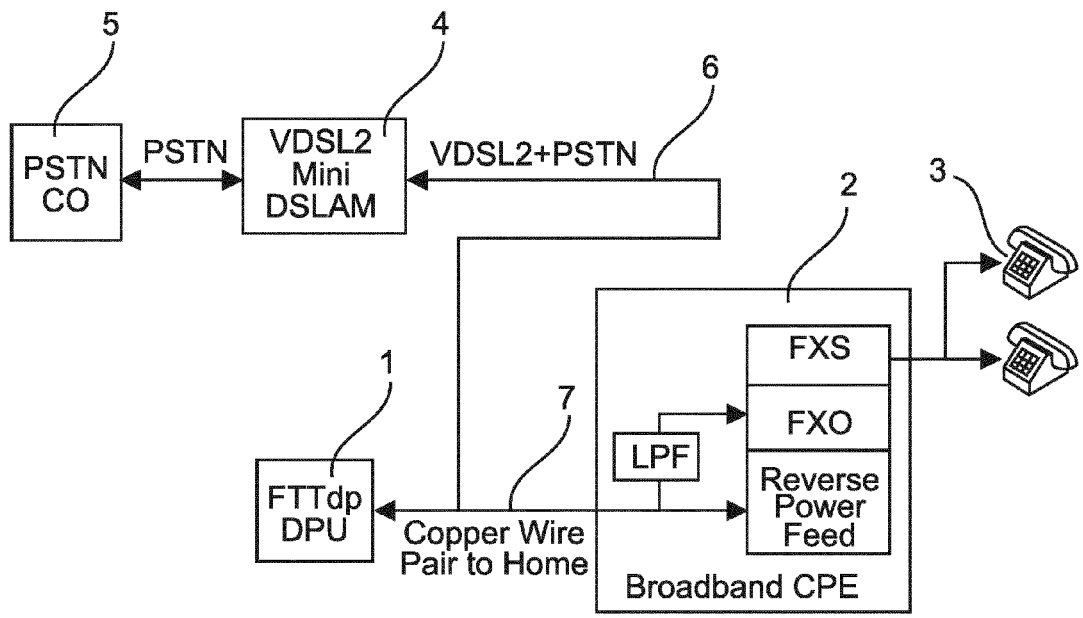
Figure 3:
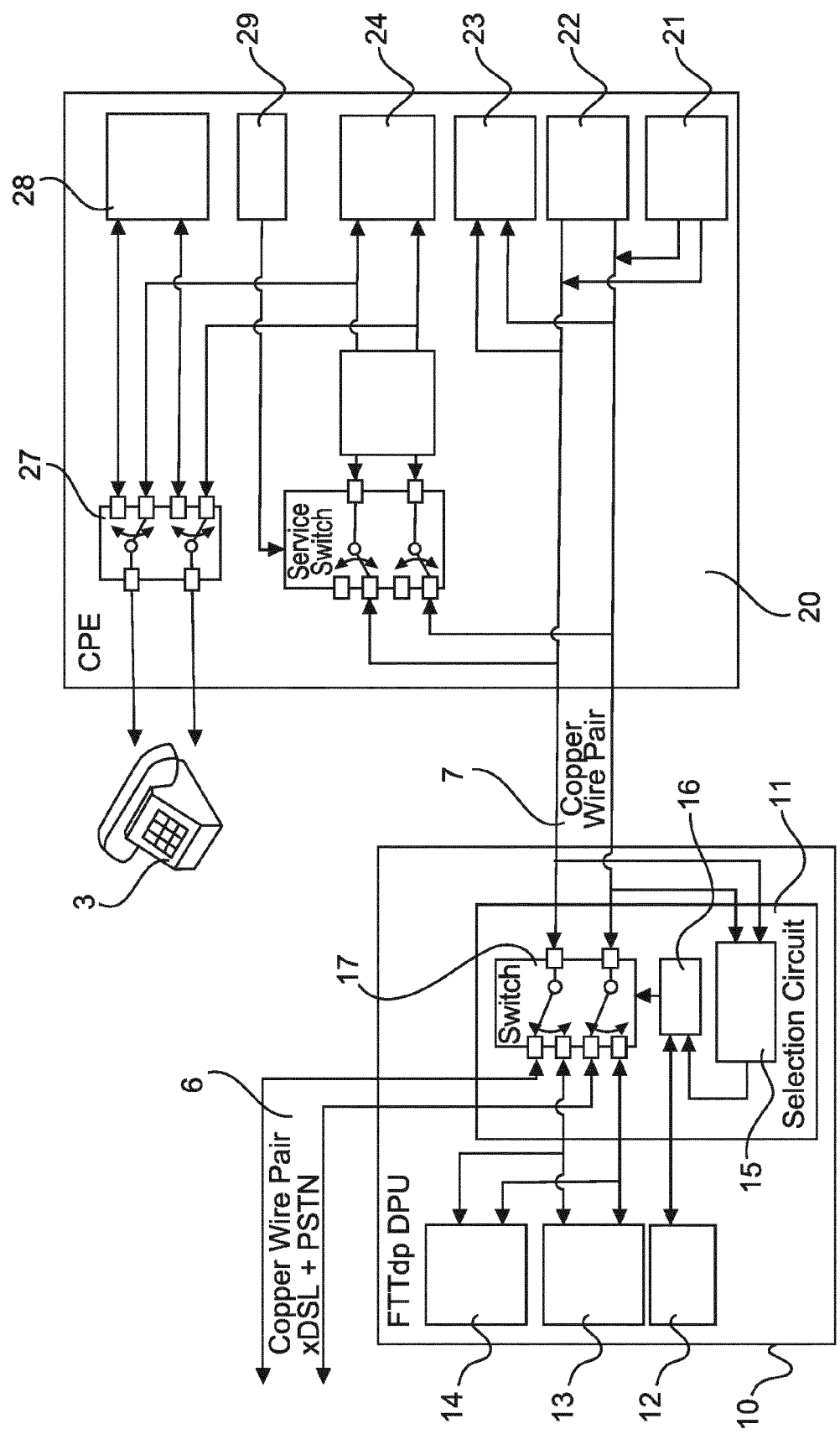

A preferred embodiment of a system comprising a DPU 10 and a CPE device 20, e.g. an access gateway 20 (AGW), is depicted in FIG. 3. The DPU 10 is coupled via a copper wire pair with the AGW 20 and is coupled via a copper line 6, with a Digital Subscriber Line Access Multiplexer (DSLAM) 4 and further with a central office (CO) 5 for providing xDSL and PSTN services, as described with regard to FIG. 2. The AGW 20 is configured to provide an xDSL service and a PSTN service for a telephone 3, or alternatively, a G.fast service via the DPU 10. The DPU 10 includes therefore a selection circuit 11 for switching between the xDSL and PSTN services and the G.fast service.

The selection circuit 11 includes a selection switch 17, for example a dual 2-to-1 port switch, for connecting the xDSL and PTSN services or the G.fast service with the AGW 20. The selection switch 17 has to be robust enough to handle the safety requirements due to the external copper line 6 and has to be designed such that its characteristics do not interfere with the services it can switch.

The AGW 20 has an AGW drive logic 21 to manage the selection of the services via the selection switch 17. The switching is performed in a preferred embodiment by sending pulse signals by the AGW drive logic 21, and via these pulse signals the selection circuit 11 is temporarily powered. The selection circuit 11 is adapted such that it only reacts to the pulse signals sent out by the AGW drive logic 21, and the selection circuit 11 does not react to or cause interference with the xDSL and PSTN services. Before a selection, the selection switch 17 is in a default state, in which the xDSL and PSTN services are connected to the AGW 20. The AGW 20 is therefore enabled for xDSL and PTSN services when it is connected the first time with the DPU 10.

In case the G.fast service is made available by a service provider to a user of the AGW 20, the AGW 20 automatically sets the DPU 10 to select the G.fast service by means of the AGW drive logic 21 of the AGW 20. After the pulse signals have been sent to the DPU 10 for selecting the G.fast service, a reverse powering of the DPU 10 is enabled via the AGW 20 for the operation of the G.fast service. The selection of the G.fast service is therefore performed such that no interference occurs with the xDSL and PSTN services. In particular, the reverse powering of the DPU 10 is not enabled before the selection circuit 11 has been switched to the G.fast service. The pulse signals for selecting the G.fast service are driven only before the G.fast service is activated, and will not be on the copper line 7 during activation of the G.fast service.

Figure 4:
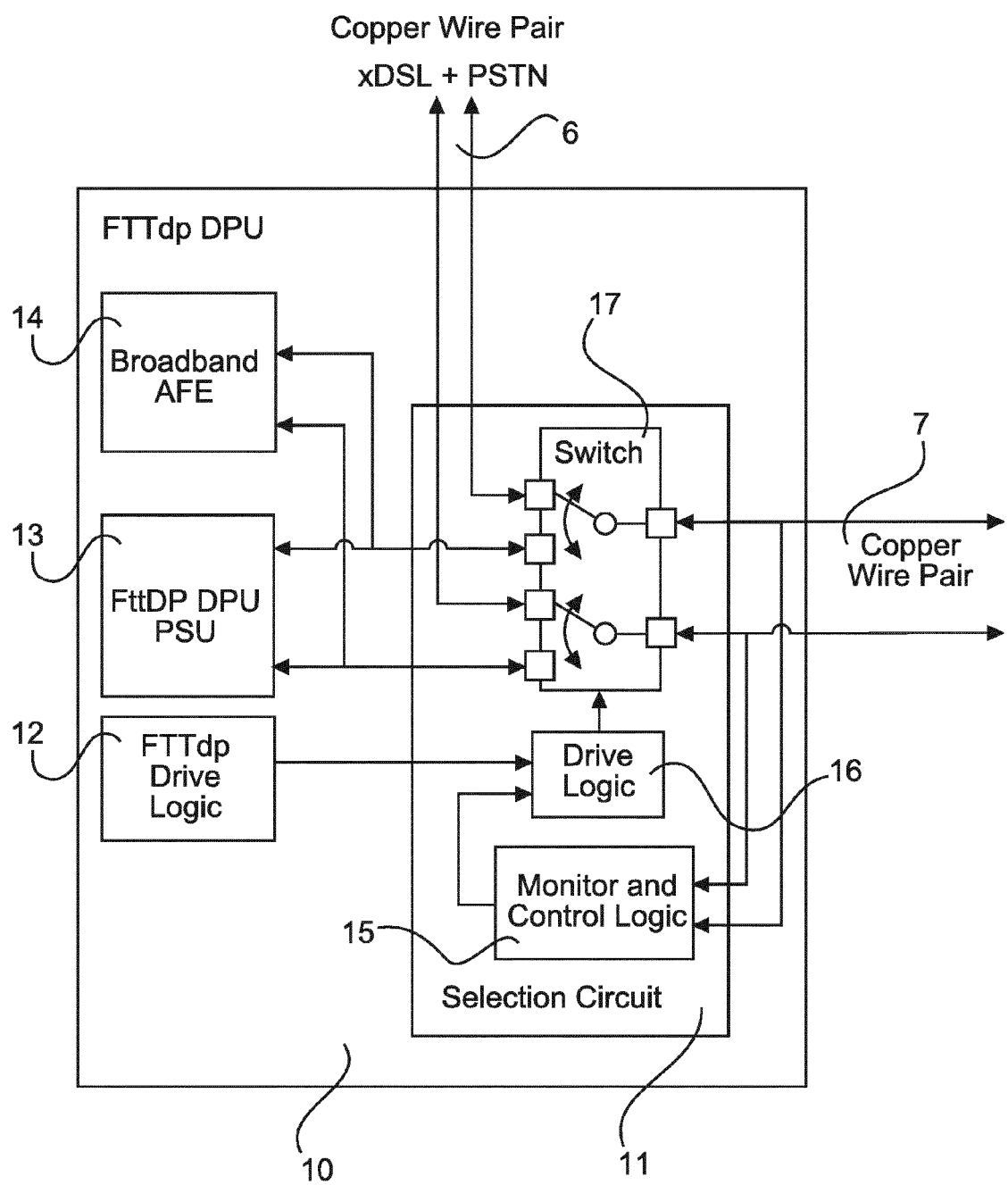

Relevant circuits of the DPU 10 are depicted in more detail in FIG. 4. The selection switch 17 of the selection circuit 11 includes a first port for a connection with the AGW 20 via the copper line 7 and a second port for a connection with the copper line 6 for providing the xDSL and PSTN services, and a third port being connected inside the DPU 10 with a broadband analog front end 14 for providing the G.fast service. The selection circuit 11 comprises in addition a monitor and control logic 15 being coupled with the first port of the selection switch 17 and being coupled via a switch drive logic 16 with the selection switch 17 for controlling the selection of the xDSL and PSTN services and the G.fast service. The DPU 10 includes further a DPU power supply unit 13, which is coupled with the third port of the selection switch 17 for powering the DPU 10, when the G.fast service is selected and a supply voltage for the DPU 10 is provided by the AGW 20 via the copper line 7.

When the xDSL and PSTN services are in operation and the monitor and control logic 15 detects switching pulses of the AGW drive logic 21 on the copper line 7, it switches the selection switch 17 via the switch drive logic 16 to the broadband analog front end 14 and to the DPU power supply unit 13 for enabling the G.fast service. The DPU 10 includes further a DPU drive logic 12 being coupled with the switch drive logic 16, via which the selection switch 17 is kept in the G.fast selection mode, when a reverse supply power is provided by the AGW 20 and the DPU control pulses are switched off by the AGW 20.

When the reverse supply power for the DPU 10 is switched off during operation of the G.fast service, the DPU 10 switches automatically to the xDSL and PSTN services. This can be provided for example by using a selection switch 17, which switches automatically to the xDSL and PSTN services in a powerless state.

Figure 5:
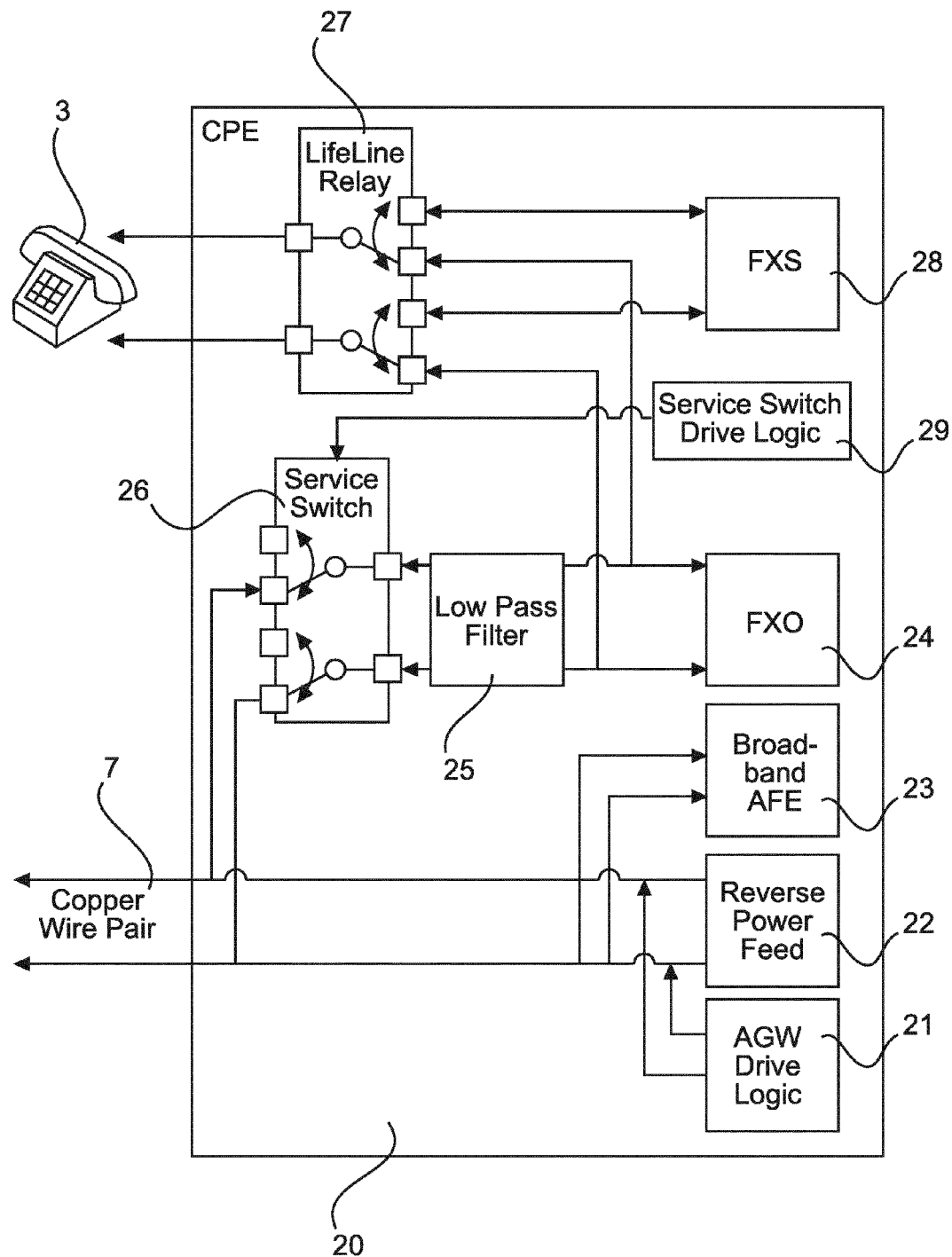

Relevant parts of the AGW 20 are depicted in more detail in FIG. 5. For the operation of the xDSL and the G.fast services, a broadband analog front end 23 is included, which processes the upstream and downstream data traffic as provided via the copper line 7. For the operation of the PSTN service, a service switch 26 is included being controlled by a service switch drive logic 29, which connects the copper line 7 with a low pass filter 25 in case the xDSL and PSTN services are enabled, and which disconnects the low pass filter 25 in case the G.fast service is enabled. The low pass filter 25 provides a connection with the telephone 3 via a life line relay 27. The AGW 20 comprises further an FXS interface 28 and an FXO interface 24 for the PSTN service, the interface 24 being connectable via the low pass filter 25 and the service switch 26 with the copper line 7.

For the G.fast service, the AGW 20 includes a reverse power supply 22 for providing the reverse supply power to the DPU 10. The reverse power supply 22 and the AGW drive logic 21 are both coupled with the copper line 7. The reverse supply power is in particular a DC supply power.

Figure 6:
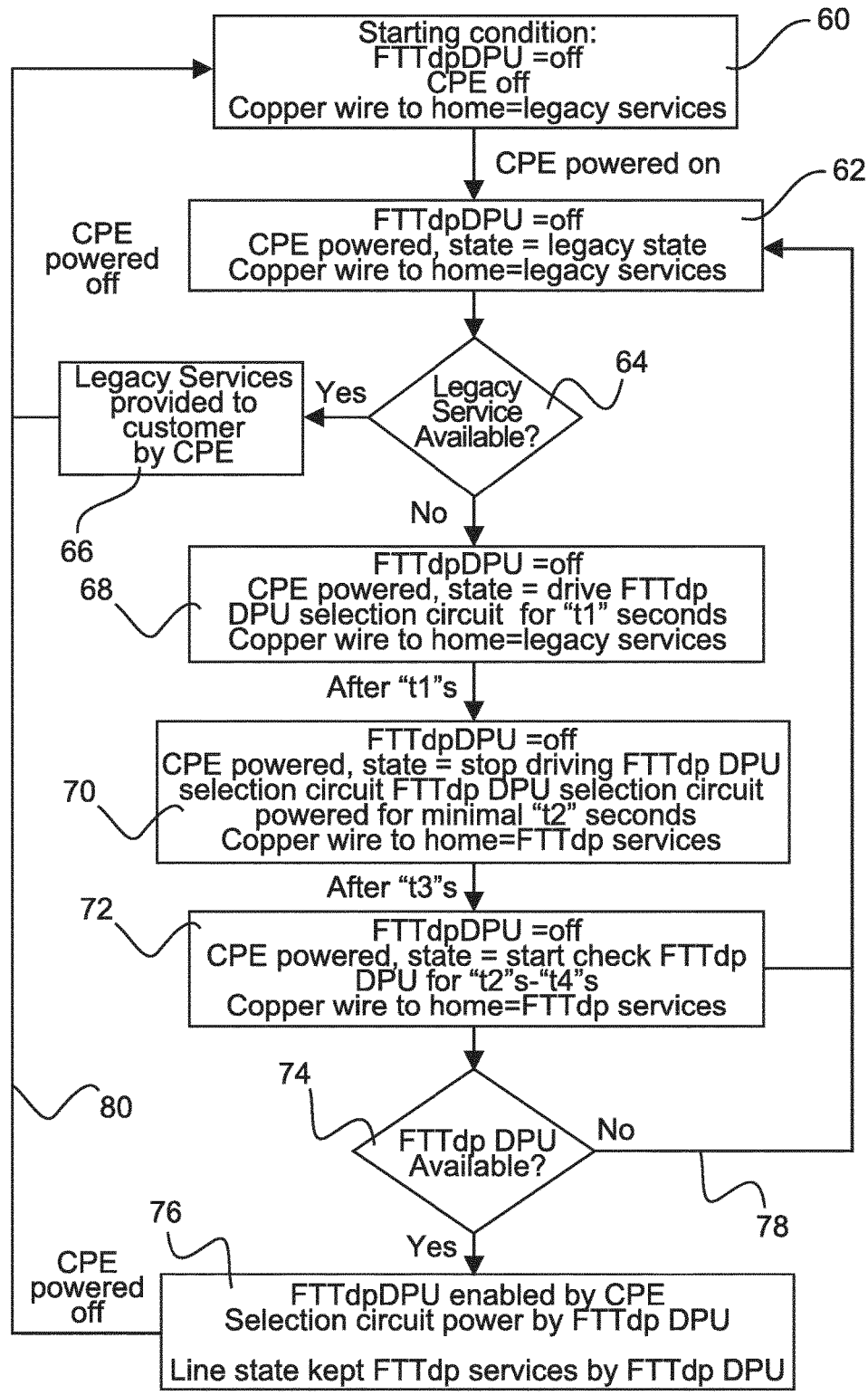

The operation of the DPU 10 and the AGW 20 is illustrated in a flow chart depicted in FIG. 6. In the initial condition, step 60, the DPU 10 and the AGW 20 are off and in a default state, in which the selection switch 17 is switched to the xDSL and PSTN services. When the AGW 20 is switched on, step 62, the AGW 20 detects that the xDSL and the PSTN services are connected via the copper lines 6 and 7. The reverse power supply 22 remains switched off. The service switch 26 is in a default state connecting the copper line 7 with the low pass filter 25. The AGW 20 then checks whether an xDSL service is available, detectable by the broadband analog front end 23, and/or a PSTN service is available, detectable by the FXO circuit 24. Is an xDSL service or a PSTN service detected, the respective service is enabled and provided by the AGW 20 to the customer, step 66, which is indicated on the AGW 20 by indicator lights, not shown.

In case no xDSL or PSTN service is detected by the AGW 20, the CPE 20 starts a procedure to detect whether there is a DPU connected to the AGW 20. The AGW 20 switches the service switch 26 to disconnect the low pass filter 25 from the copper line 7. The AGW drive logic 21 then generates signal pulses being applied to the copper line 7 to power up a DPU, e.g. DPU 10. In case the DPU 10 is available, the signal pulses provide sufficient power to operate the monitor and control logic 15 and to set the selection switch 17 to the G.fast service via the switch drive logic 16. The signal pulses are applied for a time interval t1.

After t1, the signal pulses of the AGW drive logic 21 are switched off, and the monitor and control logic 15 is operating at least for a time interval t2, during which the monitor and control logic 15 switches the selection switch 17 via the switch drive logic 16 to connect the analog front end 14 and the DPU power supply unit 13 with the copper line 7, step 70.

In a further step 72, the AGW 20 switches on the reverse power supply 22 after a time t3 for providing power via the copper line 7 to the DPU 10. The reverse power supply 22 then checks whether there is a DPU available, step 74. If the DPU 10 is detected within a time t2 minus t4, the reverse power supply 22 remains switched on.

The DPU power supply 13 then starts up to provide power for the operation of the DPU 10, and the DPU drive logic 12 triggers the switch drive logic 16 to keep the connection of the copper line 7 with the DPU power supply 13 and the analog front end 14 via the selection circuit 11, step 76. The DPU 10 is then enabled for the G.fast service.

In case the AGW 20 does not detect the DPU 10, the reverse power supply 22 is switched off after t2, also at the end of t2 the selection circuit 15 no longer has power, causing the switch 17 to revert to the xDSL and PSTN services. The procedure then continues with step 62, line 78. If xDSL and PSTN services are detected, these services are then provided to the customer, step 66.

When the AGW 20 is switched off at any time during the G.fast operation of the DPU 10, the DPU 10, respectively the G.fast channel of the DPU 10 associated with the AGW 20, switches off accordingly, because the reverse power from the AGW 20 is interrupted. The procedure returns then to step 60, via line 80, in which the copper line 7 is connected to the copper line 6 for providing xDSL and PSTN services. The procedure returns also to step 60, in case the AGW 20 is switched off after step 66.

With the DPU 10, therefore existing copper lines can be reused to offer both legacy services, xDSL and PTSN services, and a G.fast service to a customer. The legacy services and the new service can be provided with the same AGW 20 and a transparent migration between the new service and the legacy services is possible. A POTS service for the telephone 3 may be maintained, until the migration to the G.fast service is enabled. In case the G.fast service is enabled, a Voice-over-IP (VoIP) service can be provided without reconnecting the port of the telephone 3, or changing the handset. An early installation of a DPU in the field is possible by only including the selection switch 17: a G.fast service card including the modules 12-16 can be added later to the DPU. The operation of the DPU with the AGW 20 can be provided always without affecting another customer being connected to the DPU.

Also other embodiments may be utilized by one skilled in the art without departing from the scope of the present disclosure. The disclosure resides therefore in the claims herein after appended.

The invention claimed is:

1. A method for operating a distribution point unit, wherein said distribution point unit comprises a selection circuit comprising monitor and control logic and a selection switch for providing a first service or a second service to at least a customer premises equipment, the selection switch having a default state, in which the first service is provided, and a second state, in which the second service is provided, said method comprising receiving, from said customer premises equipment, a switching signal, the switching signal powering the selection circuit; and the monitor and control logic in the second circuit, when detecting the switching signal, switching the selection switch from the default state to the second state, to provide the second service to the customer premises equipment.

2. The method of claim 1, further comprising the distribution point unit receiving, via the selection switch, a supply of power from the customer premises equipment after the selection switch is switched to the second state; and a logic circuit in the distribution point unit causing the selection switch to remain in the second state and to provide the second service to the customer premises equipment, as long as the supply of power from the customer premises equipment is received.

3. The method of claim 1, comprising applying the switching signal for a time interval t1 to power the monitor and control logic during the time interval t1.

4. The method of claim 1, wherein the switching signal is a DC-free switching signal not including a direct current voltage, for example at least one of a pulse signal and an alternating current.

5. The method of claim 1, wherein the first service Is a Digital Subscriber Line and/or a Public Switched Telephone Network service, and the second service is a G.fast service.

6. A distribution point unit, wherein the distribution point unit comprises a selection circuit comprising a monitor and control logic and a selection switch providing a first service or a second service to at least a customer premises equipment, the selection switch being configured to have a default state, in which the first service is provided, and a second state, in which the second service is provided, the monitor and control logic being configured to receive, from said customer premises equipment, a switching signal, the switching signal powering the selection circuit, the monitor and control logic in the selection circuit, when powered by the selection signal, causing the selection switch to switch from the default state to the second state, to provide the second service to the customer premises equipment.

7. The distribution point unit of claim 6, comprising:

a power supply unit configured to provide power to the distribution point unit, the power supply unit being coupled to the selection switch to receive, via the selection switch, a supply of power from customer premises equipment after the selection switch is switched to the second state; and a logic circuit configured to cause the selection switch to remain in the second state and to provide the second service to the customer premises equipment, as long as the supply of the power from the customer premises equipment is received.

8. The distribution point unit of claim 6, wherein the first service is a Digital Subscriber Line and/or a Public Switched Telephone Network service, and the second service is a G fast service.

9. A customer premises equipment device, comprising a power supply for providing a supply of power to a distribution point unit over a copper line, wherein the device comprises:

a circuit configured to transmit, to the distribution point unit and over the copper line, a switching signal for powering a selection circuit in the distribution point unit, which switching signal, when received by the distribution point unit, causes a monitor and control logic in the selection circuit of the distribution point unit to switch a selection switch in the selection circuit to switch from a default state, in which a first service is provided to the customer premises equipment, to a second state, in which a second service is provided to the customer premises equipment;

the power supply being configured to provide the supply of power to the distribution point unit over the copper line, after the switching signal is switched off by the circuit;

the first service being a Digital Subscriber Line service and/or a Public Switched Telephone Network service and the second service being a high-speed copper wire service, the customer premises equipment device further comprising:

a service switch connected to the copper line and a service switch drive logic for selecting the Public Switched Telephone Network service; and a broadband analog front end coupled to the copper line for providing the Digital Subscriber Line service and the high-speed copper wire service, the service switch drive logic being configured to disconnect the Public Switched Telephone Network service and to disable the Digital Subscriber Line service, in case the high-speed copper wire service is enabled.

10. The customer premises equipment device of claim 9, wherein the customer premises equipment device is further configured to detect whether a distribution point unit is connected to the customer premises equipment device, and wherein the customer premises equipment device enables the first service, if it is determined that a distribution point unit is not connected.

11. A device configured to be connected via a copper line to a distribution point unit for a switchable connection to either a copper line connection or to a fiber optic connection, comprising:

a circuit configured to transmit, to the distribution point unit and over the copper line, a pulse signal for temporarily powering a selection circuit in the distribution point unit and to cause the selection circuit to switch from a first state, in which the distribution point unit is connected to the copper line connection for providing a Public Switched Telephone Service and a Digital Subscriber Line Service over the copper line connection of the distribution point and over the copper line between the distribution point unit and the device, to a second state in which the distribution point unit is connected to the fiber optic connection for providing a high-speed service to the device over the fiber optic connection of the distribution point unit and over the copper line between the distribution point unit and the device;

a power supply configured to provide a supply of power to the distribution point unit over the copper line between the distribution point unit and the device, when the selection circuit is switched to the second state by the transmission of the pulse signal, the selection circuit being kept in the second state when the power is supplied to the distribution point unit by the power supply in the device.

12. The device according to claim 11, wherein the high-speed service is a G.fast service.

13. The device according to claim 11, wherein the device is a gateway.

\* \* \* \* \*